US007983880B1

(12) United States Patent
Fender et al.

(10) Patent No.: US 7,983,880 B1
(45) Date of Patent: Jul. 19, 2011

(54) SIMULTANEOUS SWITCHING NOISE ANALYSIS USING SUPERPOSITION TECHNIQUES

(75) Inventors: Joshua David Fender, East York (CA); Paul Leventis, Toronto (CA)

(73) Assignee: Altera Corporation, San Jose, CA (US)

( * ) Notice: Subject to any disclaimer, the term of this patent is extended or adjusted under 35 U.S.C. 154(b) by 633 days.

(21) Appl. No.: 12/034,400

(22) Filed: Feb. 20, 2008

(51) Int. Cl.
*G06G 7/00* (2006.01)

(52) U.S. Cl. .................. 703/2; 703/13; 703/14; 703/18; 324/613; 324/628

(58) Field of Classification Search ............... 703/2, 13, 703/16, 19, 14; 716/1, 6; 702/17, 195; 324/613, 324/628
See application file for complete search history.

(56) References Cited

U.S. PATENT DOCUMENTS

| 5,280,237 | A | * | 1/1994 | Buks .............................. 324/765 |
|---|---|---|---|---|
| 5,477,460 | A | * | 12/1995 | Vakirtzis et al. .................. 716/5 |
| 6,029,117 | A | * | 2/2000 | Devgan ............................ 702/58 |
| 6,353,917 | B1 | * | 3/2002 | Muddu et al. ..................... 716/6 |
| 6,405,348 | B1 | * | 6/2002 | Fallah-Tehrani et al. ...... 716/113 |
| 6,523,149 | B1 | * | 2/2003 | Mehrotra et al. ............. 716/122 |
| 6,545,497 | B2 | * | 4/2003 | Hebert et al. ................. 324/765 |
| 6,564,355 | B1 | * | 5/2003 | Smith et al. ....................... 716/4 |
| 6,587,815 | B1 | * | 7/2003 | Aingaran et al. ............... 703/2 |
| 6,772,403 | B1 | * | 8/2004 | Sasaki ........................... 716/113 |
| 6,785,628 | B2 | * | 8/2004 | Corr .............................. 702/117 |
| 6,788,098 | B1 | * | 9/2004 | Alani et al. ...................... 326/16 |
| 6,799,153 | B1 | * | 9/2004 | Sirichotiyakul et al. ........ 703/19 |
| 6,951,001 | B2 | * | 9/2005 | Chen ............................. 716/115 |
| 7,159,160 | B2 | * | 1/2007 | Yoh et al. ....................... 714/724 |
| 7,181,716 | B1 | * | 2/2007 | Dahroug ........................ 716/115 |
| 7,279,907 | B2 | * | 10/2007 | Phoon et al. ................... 324/628 |
| 7,346,867 | B2 | * | 3/2008 | Su et al. ........................ 716/115 |
| 7,562,323 | B1 | * | 7/2009 | Bai et al. ....................... 716/115 |
| 7,595,679 | B1 | * | 9/2009 | Popovich et al. ............. 327/384 |
| 7,630,845 | B2 | * | 12/2009 | Shibata et al. .................. 702/69 |
| 7,685,549 | B2 | * | 3/2010 | Sinha et al. ....................... 716/6 |
| 7,788,620 | B1 | * | 8/2010 | Xue et al. ......................... 716/10 |
| 2004/0034840 | A1 | * | 2/2004 | Chen ................................. 716/6 |
| 2005/0099186 | A1 | * | 5/2005 | Parker et al. .................. 324/538 |

(Continued)

OTHER PUBLICATIONS

S. Chun, M. Swaminathan, L. Smith, J. Srinivasan, Z. Jin, and M. Iyer, "Modeling of Simultaneous Switching Noise in High Speed System" vol. 24, No. 2, May 2001 IEEE, pp. 132-142.*

*Primary Examiner* — Kamini S Shah
*Assistant Examiner* — Kibrom Gebresilassie
(74) *Attorney, Agent, or Firm* — Martine Penilla & Gencarella, LLP (57) ABSTRACT

Extended linear superposition methods, computer program products and systems to calculate Simultaneous Switching Noise (SSN) on victim Input/Output (I/O) pins of an electronic component caused by aggressor I/O pins is provided. A method includes calculating the quiet output voltage on a victim pin caused by the power supply only, and then calculating an aggressor noise response induced on the victim pin caused by a single aggressor pin and the power supply. To calculate SSN for a combination of aggressors, the SSNs for the different aggressors are linearly combined, and then the effects of the power supply are discounted by using the calculated quiet output voltage. Additionally, a linear victim substitution model is introduced to replace a full buffer model for a victim pin with a resistor with different resistance values depending on the induced voltage. Further, an alternate transmission line model is introduced to simplify SSN simulations of transmission lines.

20 Claims, 7 Drawing Sheets

U.S. PATENT DOCUMENTS

2005/0268264 A1* 12/2005 Nagai .................... 716/6
2005/0283668 A1* 12/2005 Ishikawa .................. 714/30
2007/0200586 A1* 8/2007 Phoon et al. ............. 324/765
2008/0027662 A1* 1/2008 Kouzaki et al. ........... 702/57
2009/0192777 A1* 7/2009 Clement et al. .......... 703/16
2009/0288050 A1* 11/2009 Celik et al. ............. 716/6

* cited by examiner

Fig. 8 ns of an electronic component according to one embodiment.

SIMULTANEOUS SWITCHING NOISE ANALYSIS USING SUPERPOSITION TECHNIQUES

BACKGROUND

Simultaneous switching noise (SSN) is defined as a noise voltage induced onto a single victim Input/Output (I/O) pin of an electronic component due to the switching behavior of other aggressor I/O pins in the device. This noise is considered in the context of either an output I/O driver victim or an input I/O buffer victim. Noise injected onto the pin of an output buffer will be attenuated by the effects on the connected transmission line, termination network, and receiver load. The shape of this noise pulse at the receiver, the far-end, is critical when considering SSN effects on output buffers. This far-end pulse can cause timing and voltage level errors. In the case of noise induced onto an input pin, there is no transmission line noise attenuation to consider. However, the noise, directly sampled by the near-end input buffer, can still cause timing and voltage level errors.

The most accurate way to determine the SSN noise waveforms is to perform a circuit simulation of a representative model. Existing methods of SSN simulations suffer from both convergence and runtime problems due to circuit complexity.

It is in this context that embodiments of the invention arise.

SUMMARY

Embodiments of the present invention provide methods, computer program products and systems to reduce the complexity of circuit simulation that is required to model Simultaneous Switching Noise (SSN). The result is an SSN simulation methodology that is faster than existing methods and solves convergence difficulties.

It should be appreciated that the present invention can be implemented in numerous ways, such as a process, an apparatus, a system, a device or a method on a computer readable medium. Several inventive embodiments of the present invention are described below.

In one embodiment, an extended linear superposition method to calculate SSN on victim Input/Output (I/O) pins of an electronic component caused by aggressor I/O pins is provided. The quiet voltage level on a victim pin caused by the power supply alone is calculated. Additionally, the aggressor noise response induced on the victim pin caused by a single aggressor pin is calculated, and then the SSN on the victim pin for a combination of aggressor pins is determined. To determine the SSN for a combination of pins, the method combines linearly the calculated individual aggressor noises for all the aggressor pins in the combination, and then discounts the effects of the power supply using the calculated quiet voltage level. The method further includes outputting the results of the SSN simulation.

In another embodiment, a linear victim substitution model is used. Linear victim substitution includes replacing a full buffer model for the victim pin with one of two resistors, a switching resistor or a direct current (DC) resistor. The switching resistor is used when calculating the quiet voltage level and the aggressor noise, and the DC resistor is used when calculating the non-switching quiet voltage level. The method further includes adding the DC quiet voltage level and subtracting the calculated quiet voltage level once for each aggressor pin in the combination. Linear victim substitution is not exclusive to simplified resistor models and is also applicable to any reduced linear model.

In another embodiment, a transmission line model is decoupled into two simplified models to calculate SSN. The transmission line model is decoupled by replacing a section of a transmission line model with a grounded transistor. The section replaced with the transistor includes the transmission line impedance in the transmission line model and the receiving end of the transmission line model following the transmission line impedance. The method to decouple the transmission line further comprises measuring a nodal voltage at the terminal of the grounded transistor not connected to ground, and then connecting a voltage source to the section beginning at the front end of the transmission line impedance. The method also includes applying the measured nodal voltage to the voltage source, and then measuring the noise at the victim pin.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Methods, computer program products and systems to calculate Simultaneous Switching Noise (SSN) on victim Input/Output (I/O) pins of an electronic component caused by aggressor I/O pins using extended linear superposition are provided.

In one embodiment, the method to calculate SSN includes calculating the quiet voltage level present on a victim pin caused by the power supply alone, and then calculating an aggressor noise response induced on the victim pin caused by a single aggressor pin and the power supply. To calculate the SSN for a combination of aggressors, the SSNs for the different aggressors are linearly combined, and then the effects of the power supply quiet voltage level are discounted using the calculated power quiet voltage level. By calculating induced noise while the power supply is enabled, the method can use linear superposition techniques due to the linear behavior of the circuit while power is on.

Additionally, a linear victim substitution model is introduced to replace a full buffer model for a victim pin with a resistor. This enables simplification of the modeling circuits that translates into faster simulations. Additionally, an alternate transmission line model is introduced to simplify SSN simulations of transmission lines. The transmission line model is replaced with two simplified models that are used in two separate operations. In the first operation, a transmission line impedance is replaced by a single transistor and a voltage is measured. In the second operation the measured voltage is fed to a section of the model for the transmission line that includes the transmission line impedance.

It will be obvious, however, to one skilled in the art, that the present invention may be practiced without some or all of these specific details. In other instances, well known process operations have not been described in detail in order not to unnecessarily obscure the present invention.

Linear superposition is both a concept and a simulation technique. The concept states that, in linear systems, the response of two simultaneous events is equal to the sum of the responses of each individual event. This concept is useful for simulations as it means that any single composite event, with n different stimulus components, can be modeled as n independent events considering each stimulus component individually. These n simulations can be added together to accurately model the single complex composite event.

Linear superposition can be used for circuit simulation provided the circuit is linear. In the case of circuit simulation, the stimulus is modeled as independent voltage and current sources. If there are n sources in total, then the circuit can be modeled as n simulations, where each simulation considers only one of the sources. While one source is being considered the other sources are ignored. In one embodiment, all sources are set to 0 volts or 0 amps. The linear superposition principle states that these n simulation results can be added together in-order to model the response of the system under stimulus by all n sources.

The problem of predicting the voltage waveform of a victim, considering the effects of SSN, has been handled by performing circuit simulations of the victim pin along with all of the aggressors. These simulations include linear on-die and package PDN models, coupled packaged models, and buffer models of various types, as described below with respect to FIG. 1. The primary problem with this approach is that it suffers from long simulation times and DC convergence problems.

One approach to reduce the SSN runtime is to measure a small set of worst case SSN conditions. These conditions can be used to estimate an upper bound of noise for a given pin configuration by mapping the configuration of interest to the nearest, conservative, worst case measured dataset. One example of this approach is to characterize the worst case pin location on a device and assume that every pin has the same performance as this pin. A more sophisticated approach is to assume that aggressor induced noise on a victim is additive. The basic approach is to perform $n^2$ peak SSN noise measurements for each combination of single aggressor and victim pin. This data can be added together to estimate the noise present on any victim pin caused by any combination of aggressors.

Using linear superposition principles allows decoupling the effects of multiple switching aggressors. The decoupled aggressors can be simulated individually and then added together. The summation result using linear superposition is comparable to the result of simulating the much harder problem of all aggressors switching simultaneously.

The concept of applying superposition to modeling SSN is not limited to the exact implementation described below, but can be applied to a wide range of modeling methods.

Figure 1:
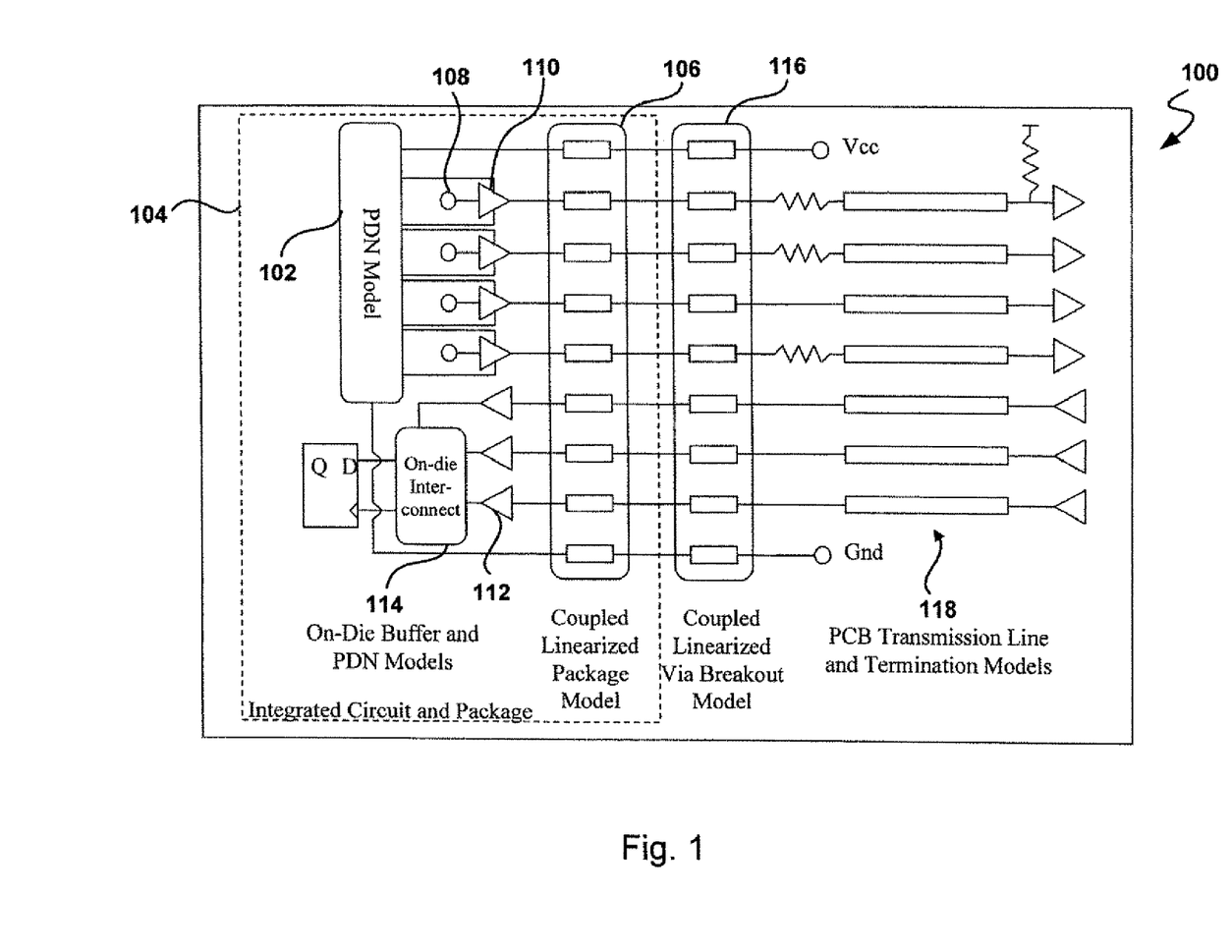
FIG. 1 shows a typical electrical model suitable for SSN simulation according to one embodiment.

FIG. 1 shows a typical electrical model suitable for SSN simulation according to one embodiment. The purpose of this topology is to illustrate the different elements that need to be modeled without specifying the exact form of the underlying model. The linear superposition method of SSN simulation is not limited to this topology, but this topology will be assumed for discussion purposes.

The SSN model models the entire signal and power paths of I/O signals, both leaving and coming into an integrated circuit of interest. On the left side of FIG. 1, a model for the integrated circuit of interest is presented, and on the right side of FIG. 1, a model of the Printed Circuit Board (PCB) and the off chip I/O buffers is shown. The integrated circuit 104 model consists of both input buffers 112 and output buffers 110. These buffers are connected to the Printed Circuit Board (PCB) through a coupled package model 106. This model is designed to include coupling between signals including return path effects. Each I/O buffer is connected to a Power Distribution Network (PDN) model 102. The purpose of PDN model 102 is to capture any PDN non-idealities that might cause noise. The final piece of the model is an on-die interconnect 114 model. This model is intended to capture any filtering effects that are present on the path between an input buffer and an internal register that eventually samples the input data.

The PCB model consists of a coupled via region breakout model 116 connected to signal transmission lines 118, termination networks, and I/O buffers. The via breakout model is important as the vertical signal path component, below the integrated circuit package, can significantly contribute to SSN noise. As drawn, the model assumes ideal ground return path and no coupling between transmission lines. This is not a requirement for the linear superposition method but rather a simplification to make the discussion easier.

Figure 2:
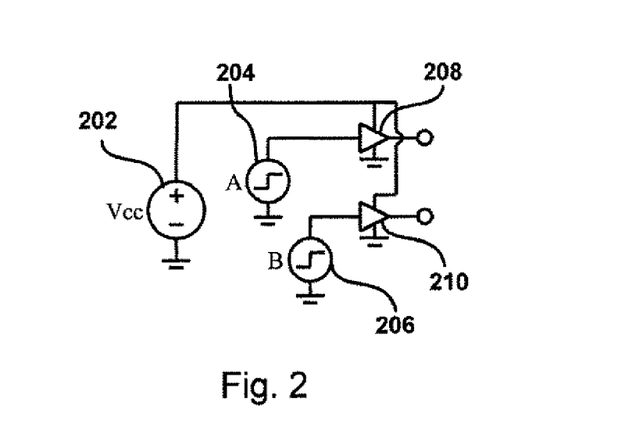
FIG. 2 describes one embodiment for SSN simulation using extended linear superposition.

FIG. 2 describes one embodiment for SSN simulation using extended linear superposition. The typical SSN model, such as the one shown in FIG. 1, is not a linear system. Different methods can be used to linearize most of the SSN model components to linear equivalents. The coupled package and via models, PDN, interconnect model, and PCB transmission lines can all be modeled using linear circuit elements with little loss in accuracy. For the purpose of this discussion all these elements are assumed to be linear, either by design or through linearization techniques. This leaves only the I/O buffers themselves as non-linear devices.

The most naïve way to apply linear superposition techniques to this system is to simply apply the methodology assuming that the system is in fact linear. The amount of error that will result from this naïve approach is directly related to how non-linear the system is. Unfortunately, I/O buffers are extremely non-linear, meaning that this method does not work at all. The primary non-linearity of I/O buffers comes from the embedded non-linear transistors and in particular to the gate to source voltage. For output buffers, this voltage is related to a Direct Current (DC) I/O supply rail. Standard linear superposition techniques would force this voltage to zero, effectively putting the I/O buffer transistors into cut-off, a state not linearly related to the typical operating range of I/O buffer transistors. In order to avoid putting the I/O transistors into cut-off, the linear superposition methodology must be extended to allow some supplies to remain nonzero.

The basic idea behind using linear superposition techniques to simulate SSN is to allow the supply voltages to remain nonzero while applying superposition only to the transitioning buffers themselves. By leaving the supply voltage nonzero, the I/O buffers are correctly biased and behave reasonably linearly. This solution solves the non-linearity problem but now causes these non-zero supplies to be counted multiple times. FIG. 2 shows a simple circuit that can be used to illustrate the non-zero supply double counting problem. The circuit models two output buffers 208 and 210, both connected to power supply Vcc 202 and controlled by step stimulus sources A 204 and B 206. Standard linear superposition techniques would perform three simulations, one for each supply, and add the results. The equation below summarizes that linear superposition can not be used by just adding the individual responses for the different sources acting alone.

$$\text{response}(Vcc+A+B) \neq \text{response}(Vcc) + \text{response}(A) + \text{response}(B)$$

As indicated above, this method does not work because the I/O buffers only behave linearly if Vcc is nonzero. The solution to this problem is to perform one simulation with A and Vcc, another one with B and Vcc, and then a third one with Vcc alone. The resulting response is calculated according to the following formula:

$$\text{response}(Vcc+A+B) = \text{response}(Vcc+A) + \text{response}(Vcc+B) - \text{response}(Vcc)$$

The equation shown above is valid under the linear superposition assumption and also insures that the output buffers are in their linear regions since Vcc is never zero. This approach allows SSN simulations of multiple aggressors to be performed independently while correctly biasing the non-linear devices. It should be noted that the method described above implicitly assumes that the victim buffers are all driving low. The reason for this is that the step stimulus sources A and B are forced to zero while not acting as aggressors. The method above can be extended to support victims driving high as follows:

$$\text{response}(vcc+A+B) = \text{response}(vcc+A+B\text{high}) + \text{response}(vcc+B+A\text{high}) - \text{response}(vcc+B\text{high} + A\text{high})$$

The correct summation of supplies is calculated while biasing the desired stimulus nodes to the correct value. In another embodiment, this methodology is extended to support arbitrary bias requirements.

Further improvements in SSN simulations can be gained by modifying the individual simulations required for applying linear superposition. The first method, board transmission line decoupling, applies to all types of SSN simulations, both complete simulations and superposition simulations. The second method applies only to the superposition method and involves replacing victim buffer models with simplified linear models.

Figure 3:
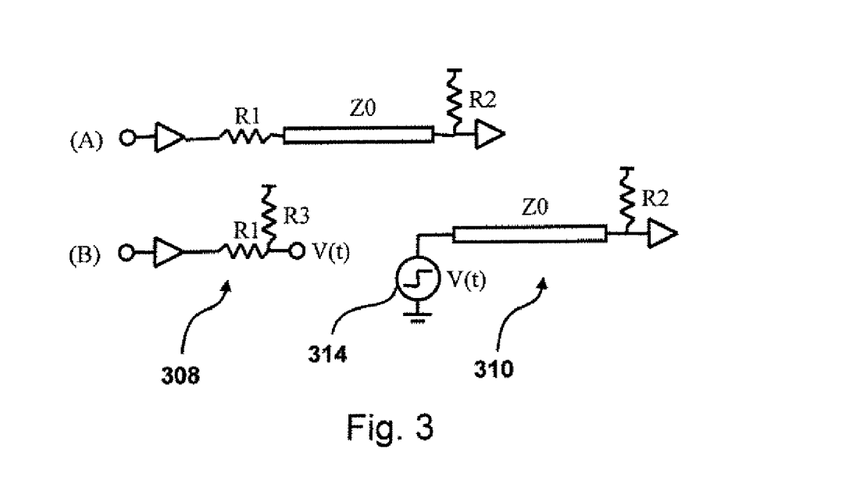
FIG. 3 depicts decomposition of a transmission line simulation into two simpler simulations, according to one embodiment.

FIG. 3 depicts decomposition of a transmission line simulation into two simpler simulations, according to one embodiment. On top of FIG. 3, section (A) illustrates a typical transmission line with termination network model including resistor R1, line impedance Z0, and resistor R2. Under certain conditions the simulation can be broken into two independent pieces, as shown in section (B). The necessary condition is that the transmission line must be well terminated at the far end, that is, there is no reflection in the transmission line. With this one condition being met, the near end of the transmission line 308 behaves exactly like a resistor to ground R3 with resistance equal to impedance Z0 of the transmission line. This simplified sub circuit can be simulated and the nodal voltage V(t) recorded.

In second simulation 310, the measured nodal voltage V(t) is replayed 314 into the transmission line model and used to calculate the resulting far end waveform. This simple decoupling method can be applied to well terminated I/O standards such as Stub Series Terminated Logic (SSTL) and High-Speed Transceiver Logic (HSTL). This reduction in circuit complexity improves the runtime performance of SSN simulations.

Performing SSN simulation using linear superposition requires multiple simulations in which only one aggressor is toggling. During each of these simulations all other output buffers are driving either a DC high or a DC low voltage. Configured in this manner, an I/O buffer can be considered approximately linear for small voltage changes. The simulation time can be greatly reduced by replacing the full buffer model of quiet pins with a linear model consisting of a single resistor and a single capacitor, or any other reduced complexity linear model. When modeling using a resistor, the resistor is connected to Vcc if the victim is driving high, and the resistor is connected to ground if the buffer is driving low. In practice the equivalent resistance of a quiet I/O buffer is non-linear and dependent on the bias voltage present at its output. In order to replace the buffer with a single resistance an approximation is necessary.

Figure 4:
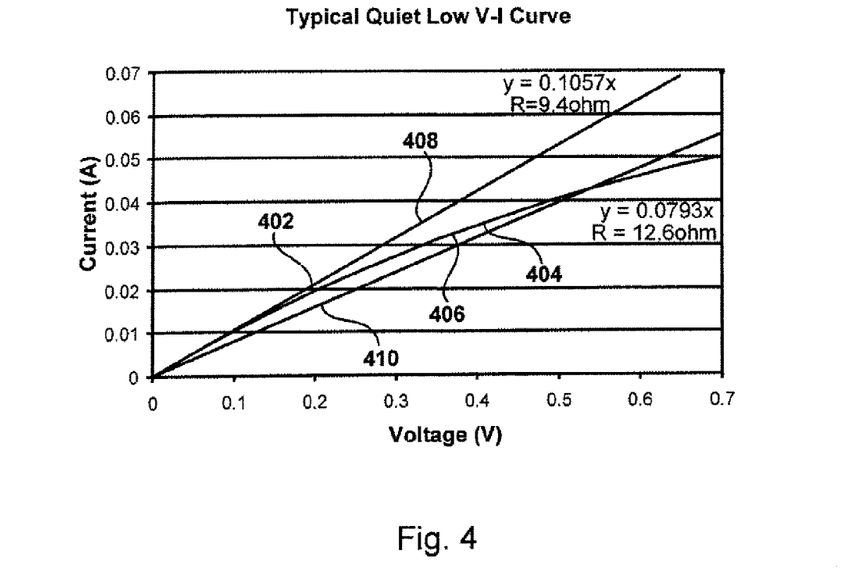
FIG. 4 depicts a typical quiet low V-I curve used for linear victim substitution for one embodiment.

FIG. 4 depicts a typical quiet low V-I curve used for linear victim substitution in one embodiment. Response curve 406 shows the non-linear nature of a typical I/O buffer pulling low. Lines 408 and 410 show two possible linear approximations for the V-I curve. In this example, the 9.4 ohm approximation matches the buffer's resistance at low DC voltage 402. The 12.6 ohm approximation is the best fit line 404 for high DC voltages.

Figure 5:
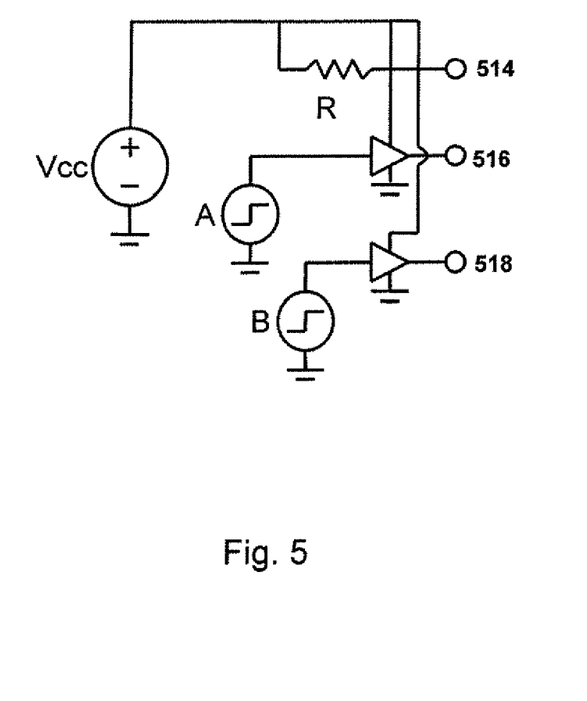
FIG. 5 shows a schematic diagram to decouple DC voltage level noise and SSN noise in one embodiment.

FIG. 5 shows a schematic diagram to decouple DC voltage level noise and SSN noise in one embodiment. Linear superposition techniques can be used to separate the problem of DC voltage level from SSN noise contributions by adding additional simulations. In FIG. 5, resistor R is a linear approximation of an output buffer driving high. The equation for determining the waveform of node 514 from aggressors 516 and 518 using the superposition method is as follows:

$$\text{Noise}_1 = \text{response}(Vcc+A) + \text{response}(Vcc+B) - \text{response}(Vcc)$$

Linear superposition results in $\text{Noise}_1$ being equal to the response of Vcc+A+B for a constant R. This method can be extended to support two different resistor R values, one for the SSN contribution, $R_{ssn}$, and one for the DC contribution, $R_{DC}$ as follows:

$$\text{Noise}_{ssn} = \text{response}(Vcc+A, R_{ssn}) + \text{response}(Vcc+B, R_{ssn}) - 2*\text{response}(vcc, R_{ssn})$$

$$\text{Noise}_{dc} = \text{response}(Vcc, R_{dc})$$

$$\text{Noise}_{total} = \text{Noise}_{ssn} + \text{Noise}_{dc}$$

The first equation calculates the SSN noise contribution and subtracts off the DC quiet output voltage. The second equation calculates the DC quiet output voltage expected using the DC resistance. The third equation combines the two results to give the correct DC voltage while allowing a more accurate linear approximation to be used for the SSN noise contribution component.

Superposition, as described above, can be used to break up one complicated SSN simulation with many non-linear buffers to several simpler simulations using linear components that can be added together. This reduction introduces significant run time improvements due to the super-linear dependence of simulation time on circuit complexity. In addition to this significant gain, even greater run time improvements can be realized when analyzing multiple victim pins or multiple aggressor combinations on a single victim.

If superposition decomposition is applied onto multiple desired simulations, many individual aggressor simulations are shared in common between the different desired simulations. In fact, all that is required to fully characterize a design from an SSN point of view are simulations for each aggressor individually. These simulations can then be added together to estimate the noise performance on any victim for any combination of aggressors. Only 2×n simulations, where n is the number of outputs on a device, are required to fully characterizes the noise of a given pin configuration, where traditional techniques would require many orders of magnitudes more. It should be noted that 2×n simulations are required as both rising and falling edges must be considered. This is in contrast to the prior full simulation technique that would require $O(n^2)$ simulations to fully characterize a design.

Similarly, different aggressor switching times can be modeled using the same technique without the need for further simulations. Aggressor pins do not have to switch at the same time and SSN can be reduced by allowing different aggressors to switch at different times. An aggressor delay can be modeled by delaying the response waveform an equal amount prior to summing the result waveform.

Figure 6:
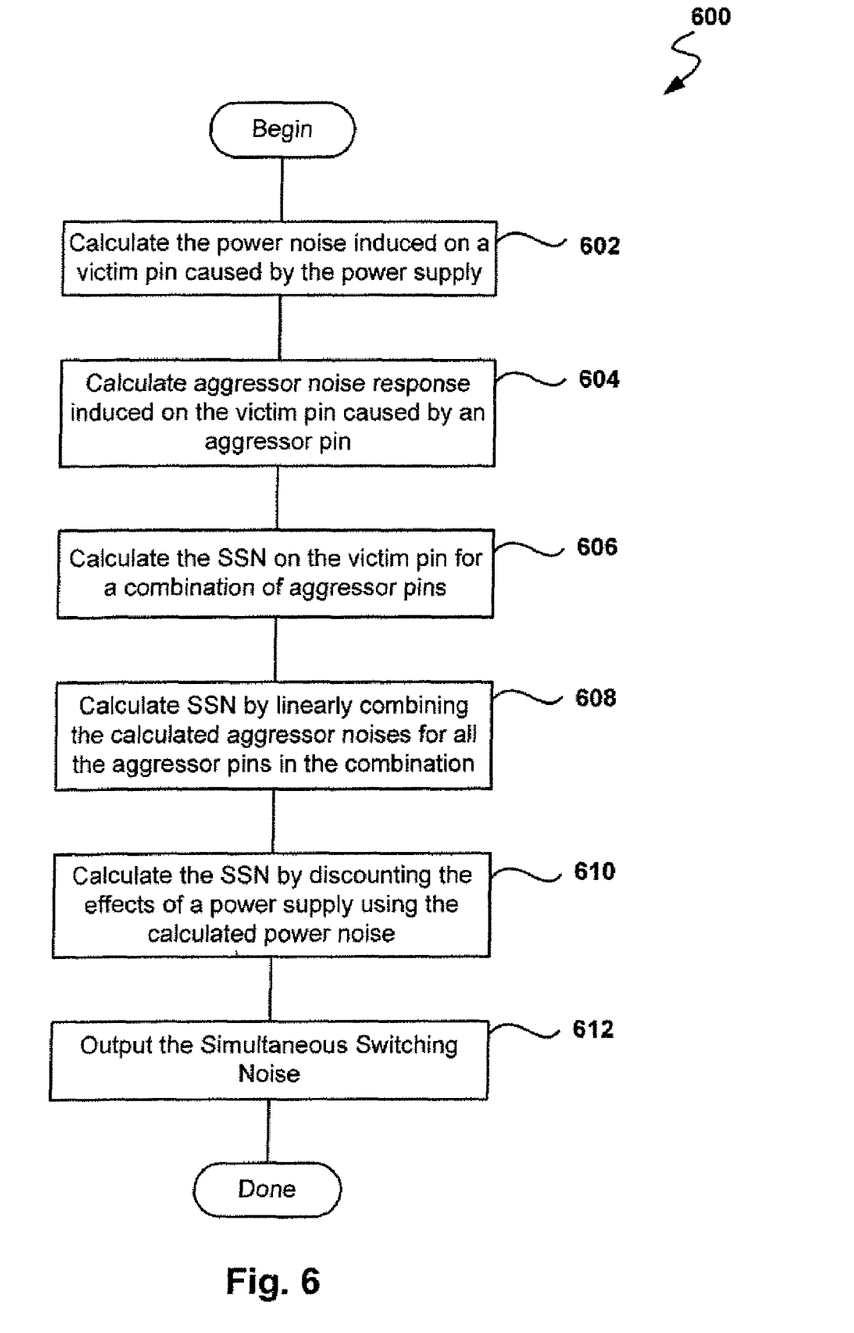
FIG. 6 shows the flow of a method to calculate SSN on victim pins according to one embodiment.

FIG. 6 shows the flow of a method to calculate SSN on victim pins according to one embodiment. In operation 602, voltage on a victim pin caused by the power supply alone is calculated to assess the quiet output voltage without any aggressor pins active. In operation 604, the noise response caused by an aggressor pin is calculated. In one embodiment, as seen in FIG. 5, the noise induced by aggressor 516 is calculated by supplying power Vcc, driving stimulus A high and stimulus B low, and then measuring the resulting noise at output 514.

In operation 606, the SSN for a combination of aggressor pins is calculated by adding the previously individually calculated aggressor noises for the aggressor pins in the combination, and then subtracting the effects of the multiple counting of the induced noise by the power supply. The effects of the power supply are discounted by subtracting the quiet output voltage calculated in operation 602 a number of times equal to the number of aggressor pins minus one applying the formula previously discussed. During operation 608, the SSN for a given combination of aggressor pins is calculated by adding the previously calculated aggressor noises for each of the aggressor pins in the combination.

In operation 610, the effects of having counted the quiet output voltage multiple times when adding the aggressor pins noise are discounted using the calculated quiet output voltage in operation 602. In operation 612, the results of the SSN calculations are output. The output can take multiple forms, such as for example reporting a panel of noise for all the victim pins, reporting which pins exceed a predetermined maximum noise permissible, displaying a graphical representation for the calculated SSN with a symbolic representation of the SSN at each pin as seen in FIG. 8, etc.

Figure 7:
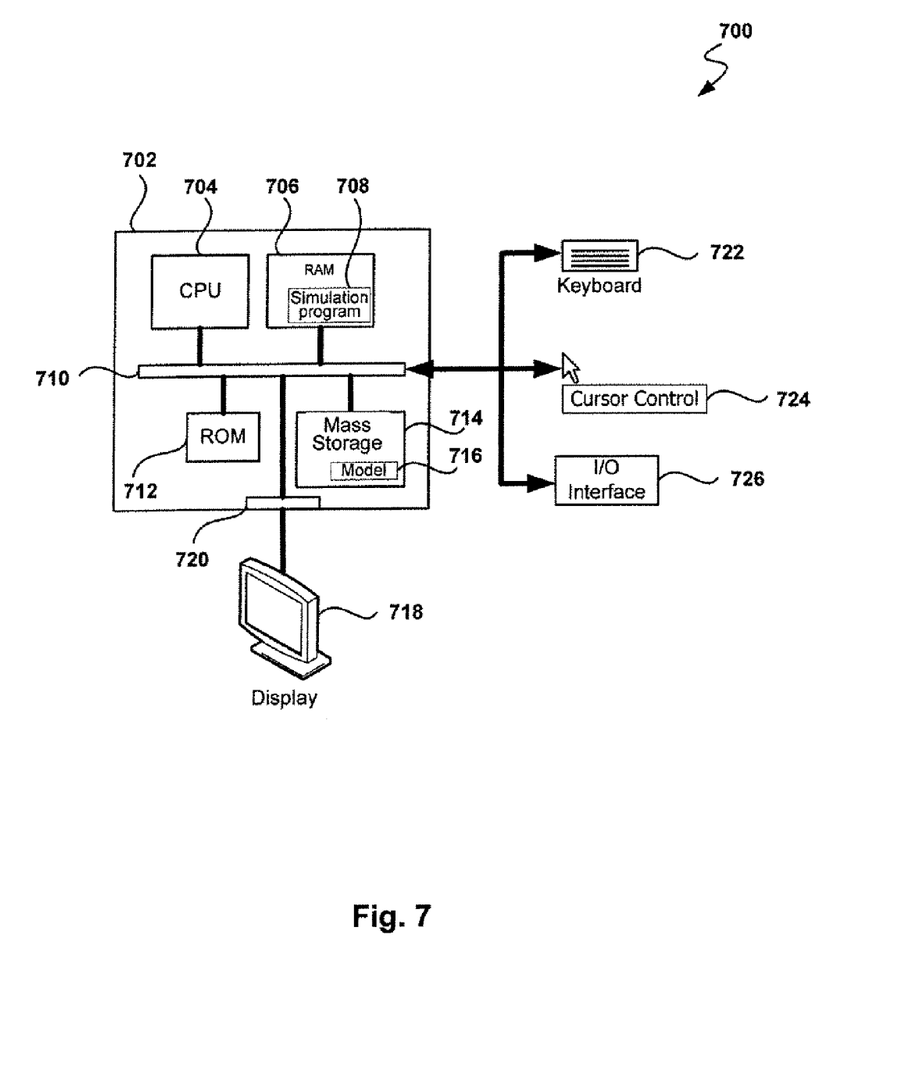
FIG. 7 is a simplified schematic diagram of a computer system for implementing embodiments of the present invention.

FIG. 7 is a simplified schematic diagram of computer system 700 for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 7 may be used to calculate SSN. The computer system includes a central processing unit (CPU) 704, which is coupled through bus 710 to random access memory (RAM) 706, read-only memory (ROM) 712, and mass storage device 714. SSN simulation program 708 resides in random access memory (RAM) 706, but can also reside in mass storage 714.

Mass storage device 714 represents a persistent data storage device such as a floppy disc drive or a fixed disc drive, which may be local or remote. SSN simulation model 716 resides in mass storage device 714, but can also reside in RAM 706 during processing. Model 716 may contain circuit models for SSN calculations. It should be appreciated that CPU 704 may be embodied in a general-purpose processor, a special purpose processor, or a specially programmed logic device. Display 718 is in communication with CPU 704, RAM 706, ROM 712, and mass storage device 714, through bus 710 and display interface 720. Of course, display 718 is configured to display the user interfaces described herein. Keyboard 722, cursor control 724, and input/output interface 726 are coupled to bus 710 in order to communicate information in command selections to CPU 704. It should be appreciated that data to and from external devices may be communicated through input output interface 726.

Figure 8:
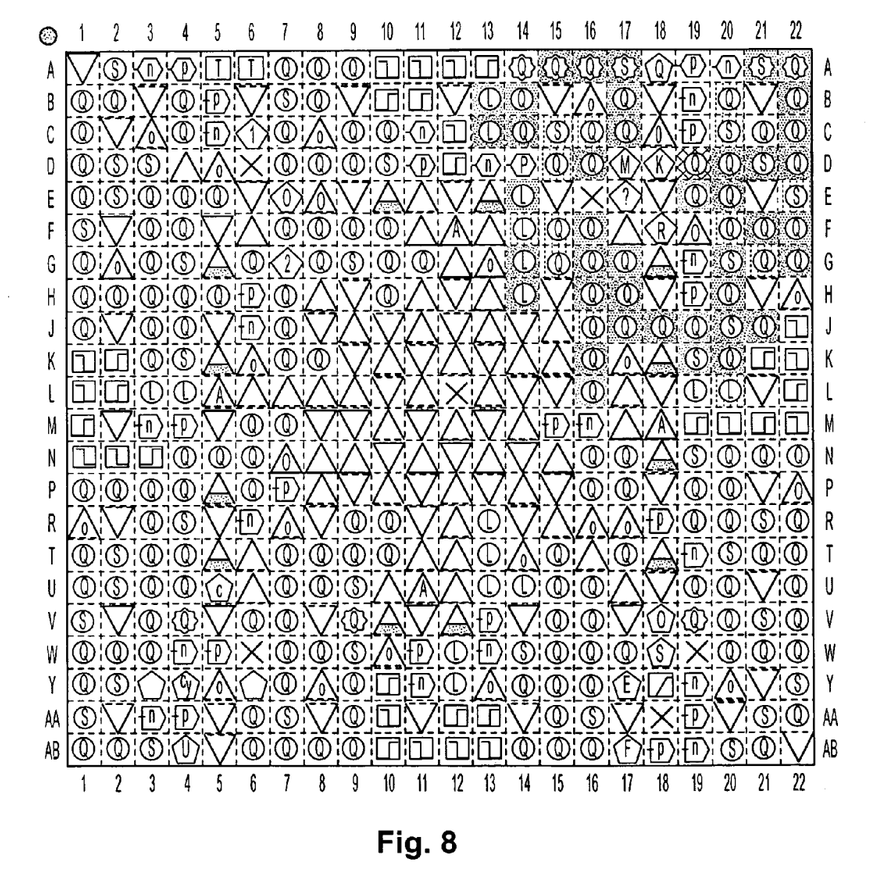
FIG. 8 is graphical representation of calculated SSN for the pins of an electronic component according to one embodiment.

FIG. 8 is graphical representation of calculated SSN for the pins of an electronic component according to one embodiment. In this embodiment, a matrix representation of the different I/O pins on the device shows the level of noise at different pins by using different colors and shading intensity. In this example, SSN is more intense on the pins in the top right corner, thereby suggesting a relocation of some of these I/O pins to different physical locations in the electronic component to decrease the interference of aggressor pins. This representation is shown as way of example, but other representations are possible using different layouts, icons, colors, shadings, etc., as long as the functionality described herein is maintained. The representation can be shown on a monitor for a user.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The method, computer program and system, for calculating SSN on victim I/O pins of an electronic component caused by aggressor I/O pins, described herein may be incorporated into any suitable integrated circuit. For example, the method, computer program and system may be incorporated into other types of programmable logic devices such as programmable array logic (PAL), programmable logic array (PLA), field programmable logic array (FPLA), electrically programmable logic devices (EPLD), electrically erasable programmable logic device (EEPLD), logic cell array (LCA), just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

The programmable logic device described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to calculate via simulation a Simultaneous Switching Noise (SSN), the method comprising:
   calculating a quiet output voltage noise induced on a victim pin caused by the power supply;
   calculating a plurality of aggressor noise responses induced on the victim pin caused by a single aggressor pin and the power supply, each response being calculated when the single aggressor pin from the plurality of aggressor pins is switching in the simulation;
   calculating the SSN on the victim pin for the plurality of aggressor pins by
      combining the calculated aggressor noise responses induced by the plurality of aggressor pins, and
      discounting noise effect of the power supply by subtracting the quiet output voltage noise from a result of the combining; and
   outputting the SSN, wherein at least one operation of the method is performed using a processor.

2. The method to calculate SSN of claim 1, wherein the calculating the quiet output voltage noise comprises:
   supplying power to an electronic component in the simulation;
   setting the plurality of aggressor pins on the electronic component to a low state in the simulation; and
   calculating noise at the victim pin in the simulation.

3. The method to calculate SSN of claim 1, wherein calculating the aggressor noise responses comprises:
   supplying power to the electronic component in the simulation;
   setting the plurality of aggressor pins on the electronic component to low except for the aggressor pin in the simulation; and
   calculating noise at the victim pin in the simulation.

4. The method to calculate SSN of claim 1, wherein the discounting comprises:
   removing an effect of a redundant inclusion of the quiet output voltage in the result by subtracting from the result the quiet output voltage noise associated with the redundant inclusion.

5. The method to calculate SSN of claim 1 further comprising:
   replacing a full buffer model for the victim pin with one of a switching resistor or a non-switching resistor;
   using the switching resistor when calculating quiet output voltage noise and aggressor noise response induced on the victim pin;
   calculating a non-switching quiet output voltage noise using the non-switching resistor; and
   adding the non-switching quiet output voltage noise and subtracting the quiet output voltage noise for each aggressor pin in the plurality of aggressor pins during the discounting.

6. The method to calculate SSN of claim 1 wherein calculating aggressor noise comprises:
   replacing, in the simulation, a section of a transmission line that is coupled to a receiving end of the transmission line with a grounded resistor, wherein the section has a transmission line impedance associated therewith;
   calculating a nodal voltage at a terminal of the grounded resistor not connected to ground;
   connecting a voltage source to a section beginning at a front end of the transmission line;
   applying the calculated nodal voltage to the voltage source in the simulation; and
   calculating noise at the victim pin.

7. The method to calculate SSN of claim 1, wherein outputting the SSN comprises displaying a graphical representation for the calculated SSN with a symbolic representation of the SSN at each pin with a calculated SSN.

8. A computer-readable non-transitory storage medium including a computer program, that when executed by one or more processors, implements a method of calculating Simultaneous Switching Noise (SSN) on victim Input/Output (I/O) pins of an electronic component caused by aggressor I/O pins, via a simulation, the method comprising:
   calculating a quiet output voltage noise induced on a victim pin caused by the power supply;
   calculating a plurality of aggressor noise responses induced on the victim pin caused by a single aggressor pin and the power supply, each response being calculated when the single aggressor pin from the plurality of aggressor pins is switching in the simulation; and
   calculating the SSN on the victim pin for the plurality of aggressor pins by
      combining the calculated aggressor noise responses induced by the plurality of aggressor pins, and
      discounting noise effect of the power supply by subtracting the quiet output voltage noise from a result of the combining; and
   outputting the SSN.

9. The computer-readable medium as recited in claim 8, wherein the method further comprises at least one of:
   identifying calculated SSN noise in a plurality of pins;
   identifying pins with an associated noise value that exceeds a predetermined threshold value; or
   displaying a graphical representation for the calculated SSN with a symbolic representation of the SSN at each pin.

10. The computer-readable medium as recited in claim 8, wherein calculating the quiet output voltage noise comprises:
   supplying power to the electronic component in the simulation;
   setting all pins on the electronic component to a high state in the simulation; and
   calculating noise at the victim pin.

11. The computer-readable medium as recited in claim 8, wherein calculating the aggressor noise responses comprises:
   supplying power to the electronic component in the simulation;
   setting all aggressor pins on the electronic component to high except for the aggressor pin in the simulation; and
   calculating noise at the victim pin.

12. The computer-readable medium as recited in claim 8, wherein discounting the noise effects of the power supply comprises:
   removing an effect of a redundant inclusion of the quiet output voltage noise in the result by subtracting from the result the quiet output voltage noise associated with the redundant inclusion.

13. The computer-readable medium as recited in claim 8, wherein the method further comprises:
   creating a model of the victim pin, the model having a resistor, the resistor having different values when submitted to low direct current (DC) or high DC; and
   adding a non-switching quiet output voltage noise to the result and subtracting from the result the calculated quiet output voltage noise once for each aggressor pin in the plurality of aggressor pins during the discounting.

14. A device to calculate via simulation a Simultaneous Switching Noise (SSN), the device comprising:
   a processor;
   a display configured to render results of a simulation; and
   a memory operable to store information associated with a model of an electronic component for simulation, and wherein the memory is further operable to store information associated with a circuit simulation program,
   wherein program instructions associated with the circuit simulation program when executed by the processor cause the processor to implement a method comprising;
      calculating a quiet output voltage noise induced on a victim pin caused by the power supply;
      calculating a plurality of aggressor noise responses induced on the victim pin caused by a single aggressor in and the power supply, each response being calculated when the single aggressor pin from the plurality of aggressor pins is switching in the simulation; and
      calculating the SSN on the victim pin for the plurality of aggressor pins by,
         combining the calculated aggressor noise responses induced by the plurality of aggressor pins, and
         discounting noise effect of the power supply by subtracting the quiet output voltage noise from a result of the combining.

15. The device as recited in claim 14 wherein the model of an electronic component comprises:
   a power distribution model,
   a driving output buffer model,
   a receiver buffer model,
   an on-die buffer model,
   a coupled linearized package model,
   a coupled linearized via breakout model,
   a printed circuit board (PCB) transmission line model, and
   a PCB termination model.

16. The device as recited in claim 14, wherein all the aggressor pins switch contemporaneously in the simulation.

17. The device as recited in claim 14, wherein the aggressor pins switch at different times in the simulation.

18. The device as recited in claim 14, wherein calculating aggressor noise includes:
   replacing a section of a transmission line model with a grounded resistor, the section including a transmission line impedance and a receiving end of the transmission line coupled to the transmission line impedance;
   calculating a nodal voltage at a terminal of the grounded resistor not connected to ground;
   modeling a voltage source connected to a section beginning at a front end of the transmission line impedance;
   applying the calculated nodal voltage to the voltage source in the simulation; and
   calculating a noise at the victim pin.

19. The device as recited in claim 18, wherein the transmission line is terminated to avoid reflections.

20. The device as recited in claim 14, wherein the rendered results comprises at least one of:
   identifying calculated SSN noise in a plurality of pins;
   identifying pins with an associated noise value that exceeds a predetermined threshold value; or
   displaying a graphical representation for the calculated SSN with a symbolic representation of the SSN at each pin.

* * * * *